United States Patent
Bravo

[11] Patent Number: 5,868,038
[45] Date of Patent: Feb. 9, 1999

[54] ADJUSTABLE AXIAL FASTENING DEVICE FOR AN ACTUATING CABLE

[75] Inventor: Ernesto Bravo, Cambiano, Italy

[73] Assignee: Dr. Ing. h.c.F. Porsche AG, Weissach, Germany

[21] Appl. No.: 829,183

[22] Filed: Mar. 31, 1997

[30] Foreign Application Priority Data

Mar. 29, 1996 [IT] Italy .................................. TO96A0244

[51] Int. Cl.⁶ .................................................... F16C 1/10
[52] U.S. Cl. .................................. 74/502.4; 74/501.5 R; 74/502; 74/500.5
[58] Field of Search .................. 74/500.5–502.6

[56] References Cited

U.S. PATENT DOCUMENTS

| | | | |
|---|---|---|---|
| 3,289,491 | 12/1966 | Conrad | 74/501.5 R |
| 3,393,578 | 7/1968 | Tschzanz | 74/501.5 R |
| 3,572,159 | 3/1971 | Tschanz | 74/501.5 R |
| 3,859,866 | 1/1975 | De Grazia | 74/512 |
| 4,177,691 | 12/1979 | Fillmore | 74/501.5 R |
| 4,294,133 | 10/1981 | Hurley . | |
| 4,658,668 | 4/1987 | Stocker | 74/501.5 R |
| 5,142,933 | 9/1992 | Kelley | 74/502 |
| 5,161,428 | 11/1992 | Petruccello | 74/502.4 |
| 5,575,180 | 11/1996 | Simon | 74/502.4 |
| 5,682,797 | 11/1997 | Kelley et al. | 74/502.4 |

FOREIGN PATENT DOCUMENTS

0509629A2  10/1992  European Pat. Off. .

OTHER PUBLICATIONS

Search Report, Apr. 9, 1998, Europe.

Primary Examiner—Vinh T. Luong
Attorney, Agent, or Firm—Evenson McKeown Edwards & Lenahan, PLLC

[57] ABSTRACT

An adjustable actuator cable assembly has cable support member supported in an outer sleeve. A securing member is radially movable in an opening of the outer sleeve between an unlocking position permitting axial adjustment of the cable support member in the sleeve and a locking position locking the cable support member and sleeve against relative axial movement. The securing member includes radially extending teeth engageable into a softer material of the cable support member to plastically deform the surface of the cable support member when moved to the locking position.

10 Claims, 3 Drawing Sheets

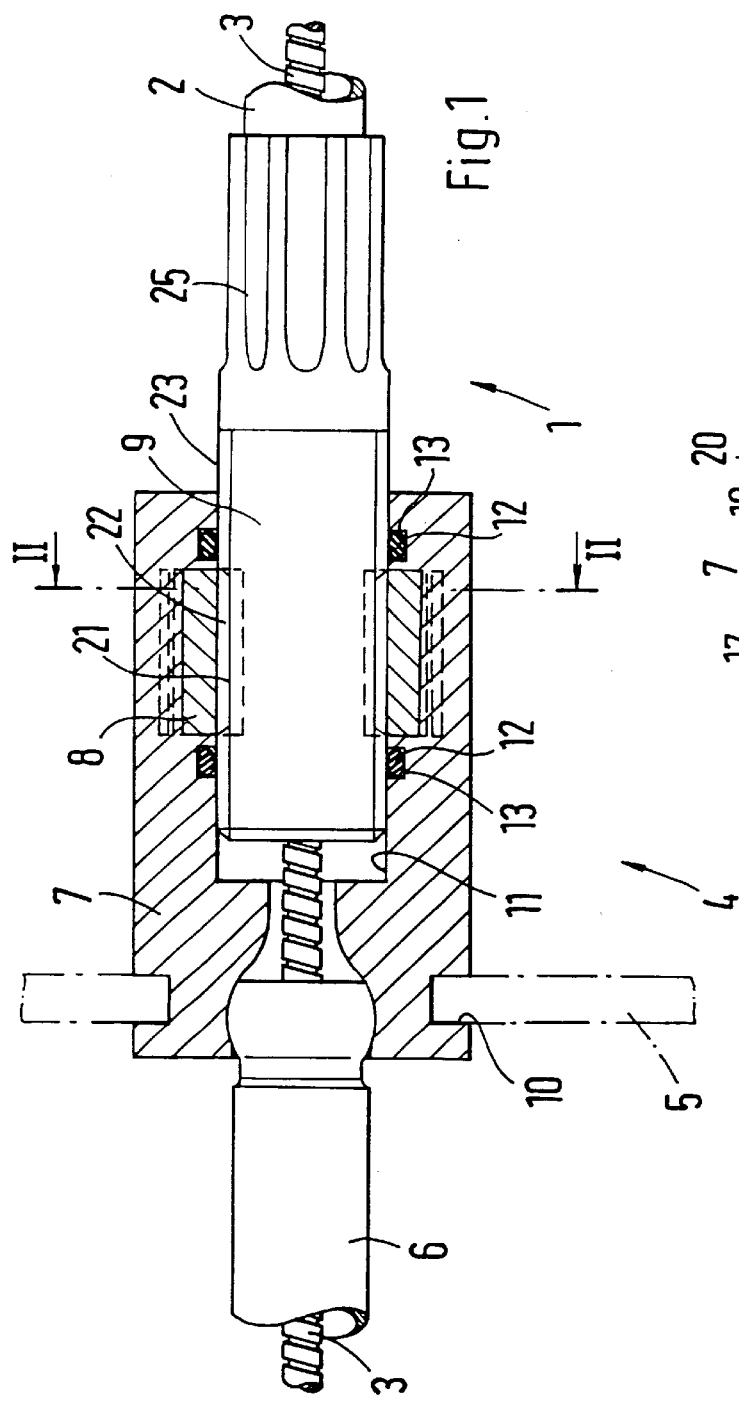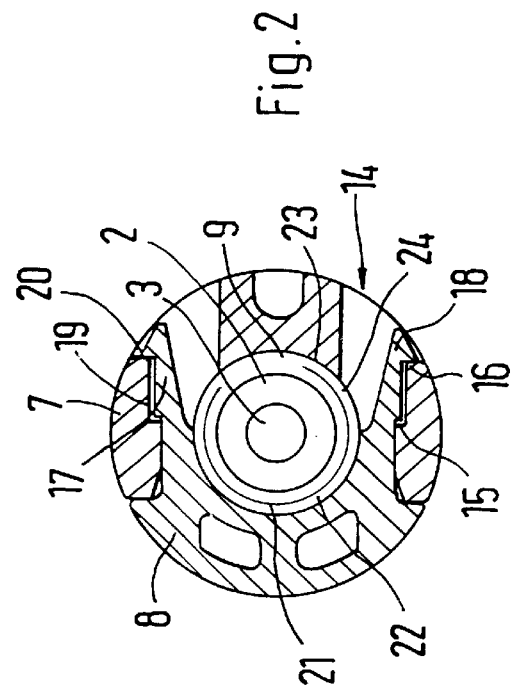

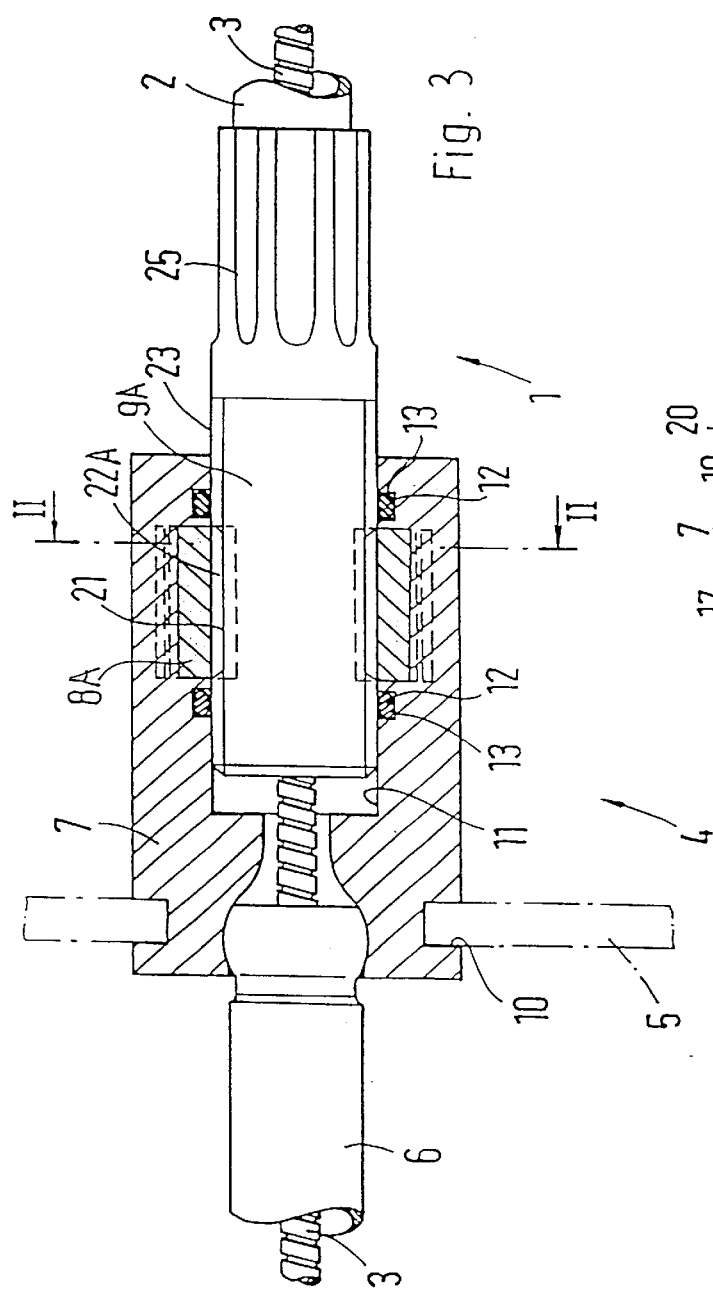
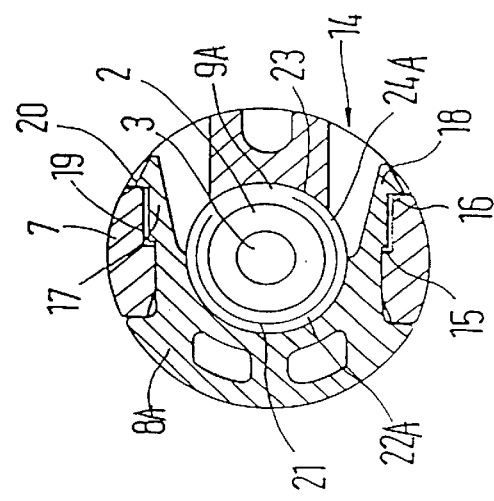

ADJUSTABLE AXIAL FASTENING DEVICE FOR AN ACTUATING CABLE

BACKGROUND AND SUMMARY OF THE INVENTION

This application claims the priority of Italian application TO 96 A 000244 filed Mar. 29, 1996 in Italy.

The invention relates to an adjustable axial fastening device for an actuating cable, which comprises an actuating covering and a core, at least one of these two actuating members being provided at the end with an adjustable axial fastening device.

With actuating cables it is necessary to adjust them during assembly and possibly to carry out a further (subsequent) adjustment at a later time. In this case it is usual to set the axial distance between the actuating covering and the core. For this purpose an adjustable axial fastening device is provided at the end of at least one of these two components. Generally known adjustable axial fastening devices comprise a threaded part for example, on which a stop is formed by means of two nuts locked against each other. It is likewise generally known to screw a threaded part of this type firmly in a holding means and to secure it by a lock nut. In addition it is generally known, for throttle cables for internal-combustion engines for example, to provide a fastening device with a plurality of grooves arranged in succession and to insert a retaining spring into one of these grooves, the retaining spring then acting as a stop on a retaining plate.

In contrast, an object of the invention is to provide an adjustable axial fastening device for an actuating cable, which can be precisely adjusted and is easy to assemble.

In order to attain this object, it is proposed according to the invention to use a securing member for an adjustable axial fastening device, the securing member being movable radially with respect to the actuating cable and being provided on the inside with a radial set of teeth in an area which embraces the attachment part. A rapid and precisely adjustable axial fixing is now possible in an advantageous manner. Since a rotational movement is not necessary in this case, it is also no longer necessary—in contrast to the known solutions—to support the attachment member during adjustment, so that the rotational movement required for fastening known securing members is not transmitted to the attachment member.

Advantageous further features of preferred embodiments of the invention are set out below.

In preferred embodiments, it is proposed to give the set of teeth of the securing member a pitch. This makes it possible to alter the axial adjustment subsequently, without the securing member having to be released. Although it is now necessary to rotate the attachment part for this subsequent adjustment, the above-mentioned advantage of the initial assembly without rotation is retained.

For the area of the attachment part which cooperates with the securing member, it is provided, in preferred embodiments that it is given a corresponding set of teeth.

Alteratively, for the area cooperating with the securing member it is proposed in an alternative embodiment to make the area in the attachment part softer than the securing member in the area of its set of teeth and to make it at least partially plastically deformable. With this embodiment the set of teeth of the securing member bites into the soft area of the attachment part during assembly and produces a corresponding toothing here.

For the securing member it is proposed, according to certain preferred embodiments that the attachment part has an aperture into which the securing member can be inserted and in which catching means cooperating with the securing member are provided in order to lock the securing member in the end position thereof. In a further development of these embodiments, it is proposed to construct the catching means with two steps and additionally to provide a locking in an assembly position before the locking in the end position. In this way, it is made possible for the securing member to be pre-assembled on the attachment part in such a way as to prevent its loss and for the assembly and adjustment procedure of the actuating cable to be simplified.

Finally, it is proposed for certain preferred embodiments to form the contour of the securing member in such a way that it is inserted flush into the outer contour of the attachment part in the end position. This step improves the fastening of the axial adjustment, since the securing member now no longer has any engagement surfaces for inadvertent detachment.

BRIEF DESCRIPTION OF THE DRAWINGS

FIG. 1 is a longitudinal sectional view through an axial fastening device with an actuating cable, constructed according to a first preferred embodiment of the invention;

FIG. 2 is a sectional view along the line II—II in FIG. 1 showing the fastening device in a locked position.

FIG. 3 is a longitudinal sectional view through an axial fastening device with an actuating cable, constructed according to a second preferred embodiment of the invention; and FIG. 4 is a sectional view along the line III—III in FIG. 3 showing the fastening device in a locked position.

DETAILED DESCRIPTION OF THE DRAWINGS

Figure 2A:
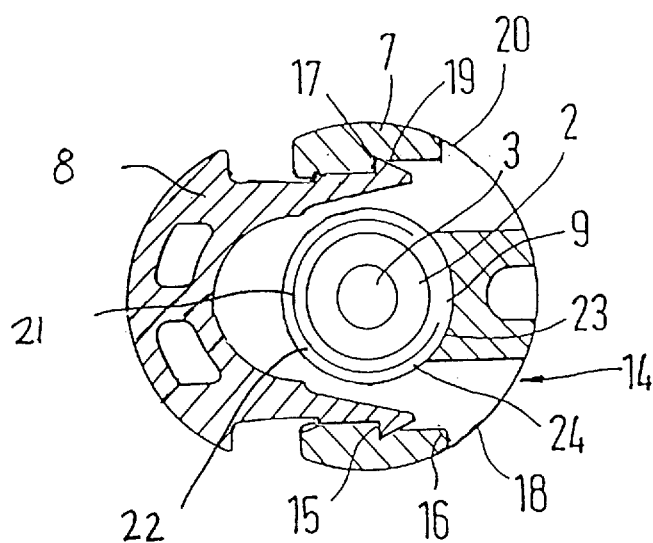
FIG. 2A is a sectional view along the line II—II in FIG. 1 showing the fastening device in an intermediate adjustable position.

The illustrated actuating cable 1 comprises an actuating covering 2 and a core 3. At the end of the actuating cable 1 an attachment member 4 is mounted on the actuating covering 2 thereof, and is held in a holder 5 and acts as an adjustable axial fastening device. The core 3 extends beyond the attachment member 4 and is protected from soiling and damage by a sleeve 6 mounted in the attachment member 4. A further, non-adjustable fastening device (not shown) is provided at the end of the core 3.

The attachment member 4 comprises an outer sleeve 7, a securing member 8 and an inner sleeve 9. The outer sleeve 7 is fastened to the holder 5 in both the axial and the radial directions. In the present embodiment a continuous groove 10, into which the holder 5 engages, is provided for this purpose on the outer sleeve 7. The inner sleeve 9 is mounted on the actuating covering 2 of the actuating cable 1 and is securely connected thereto; when an inner sleeve 9 is produced from plastics material, this can be carried out for example by injection-molding onto the actuating covering 2.

The outer sleeve 7 is provided with a bore 11 which receives the inner sleeve 9. The inner sleeve 9 is guided in the bore 11 by O-rings 12 which are inserted into grooves 13 in the outer sleeve 7.

As shown in greater detail in FIG. 2, the securing member 8 is guided in a substantially box-shaped aperture 14 in the outer sleeve 7. On its walls situated radially to the actuating cable 1 the aperture 14 has two spaced steps 15, 16.

Corresponding thereto, two catching fingers 17, 18 likewise provided with two steps 19, 20 are arranged on the securing member.

In the end position of the securing member 8 illustrated in FIG. 2, the actuating cable 1 is fixed with respect to its axial position, by the securing member 8 embracing the inner sleeve 9 and thus securing it axially with respect to the outer sleeve 7. In this case, the first steps 19 of the catching fingers 17, 18 engage behind the corresponding first steps 15 of the aperture 14, and the second steps 20 of the catching fingers 17, 18 engage behind the second steps 16 of the aperture 14. In an intermediate assembly position illustrated in FIG. 2A, the second steps 20 of the catching fingers 17, 18 engage behind the first steps 15 of the aperture 14, so that, although the securing member 8 is held in the aperture 14, it does not yet engage with the inner sleeve 9. As is clear from FIG. 2, in its end position illustrated, the securing member 8 terminates flush with the outer contour of the outer sleeve 7, so that there are no engagement surfaces for inadvertently detaching the securing member 8 from its locked state. If the securing member 8 is to be removed or detached, it is necessary to grip and press together the catching fingers 17, 18 by reaching into the aperture 14, so that the steps 19, 20 of the catching fingers 17, 18 are disengaged from the steps 15, 16 of the aperture 14.

The inside of the securing member 8 has a first area 21 which embraces a corresponding second area 23 of the inner sleeve 9. In this case the internal dimension of the first area 21 is slightly smaller than the external dimension of the second area 23, so that where the two areas 21, 23 touch there is penetration of the two areas 21, 23. For this purpose, in the embodiment shown, the first area 21 of the securing member 8 is provided with a set of teeth 22 and the corresponding area 23 of the inner sleeve 9 is provided with a set of teeth 24. In the end position illustrated, the sets of teeth 22, 24 mesh and thus produce positive locking in the axial direction between the inner sleeve 9 and the securing member 8. The securing member 8 is in turn supported in the aperture 14 on the outer sleeve 7, and the outer sleeve 7 is then supported by the groove 10 on the holder 5, so that as a whole the actuating covering 2 is fixed axially on the holder 5.

In the example illustrated in FIGS. 1, 2, and 2A, it is possible to select the axial position of the actuating covering 2 is a stepped manner in stages, corresponding to the width of the sets of teeth 22, 24.

In addition, the sets of teeth 22, 24 are given a pitch, so that by rotating the inner sleeve 9 with respect to the securing member 8 a continuous axial displacement can be achieved. In order to make possible an axial setting of this type for a subsequent or fine adjustment, a gripping area 25 is provided on the inner sleeve 9, the gripping area 25 having radial gripping members, so that the inner sleeve 9 can be gripped for rotation purposes. In the case of a fixed connection between the inner sleeve 9 and the actuating covering 2, the actuating covering 2 must be jointly rotated, whereas in the case of an alternative provision of a rotatable mounting of the actuating covering 2 in the inner sleeve 9 the actuating covering 2 need not be rotated for fine adjustment.

FIGS. 3 and 4 illustrate a second embodiment which is similar to the embodiment of FIGS. 1, 2, and 2A with respect to elements designated by the same reference numbers.

In the embodiment (not shown), the inner sleeve 9A is made completely softer, or softer at least in the region 24A, than the securing member 8A in the region of its set of teeth 22A. This region 24A is now made smooth. When the securing member 8A is assembled, the set of teeth 22 thereof bites into the softer material at region 24A of the inner sleeve 9A and produces a corresponding toothing by plastic or at least partially plastic deformation of the material. As a result of this deformation the forces during assembly are greater, but a continuous adjustment of the axial position of the actuating cable 1 is now possible during the initial assembly. The possibility described above with respect to the FIG. 1 embodiment for subsequent adjustment is retained, since as the inner sleeve 9 is rotated the set of teeth 22A bites further into the material and thus gradually produces a thread.

It is to be understood that the reverse case of application is also possible, i.e. the inner sleeve 9A has a set of teeth 24 on the outside, whereas the area 22A on the securing member 8A is now made softer and is provided with a smooth surface. It is also to be understood that the axially adjustable attachment member 4 illustrated can be used in the same way for the actuating covering 2 as for the core 3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An adjustable actuator cable assembly comprising:

a cable supporting member which in use is axially fixedly disposed with respect to a cable supported therein, said cable supporting member having a first locking surface facing radially outwardly, an outer sleeve surrounding the cable supporting member, said outer sleeve including a radial opening, a securing member having a second locking surface, said securing member being supported at the outer sleeve for selective movement in said radial opening between a first position with said second locking surface spaced from the first locking surface to permit relative axial adjusting movement of the outer sleeve and cable supporting member and a second position with said first and second locking surfaces in abutting engagement to axially lock said outer sleeve and cable supporting member together, wherein one of the first and second locking surfaces is in the form of radially extending teeth and the other of the first and second locking surfaces is in the form of a plastically deformable section, wherein the deformable section is formed of a material which is softer than the material of the teeth, and is plastically deformed by said teeth when the securing member is in said second position.

2. An assembly according to claim 1, comprising a two-step catch arrangement on said outer sleeve and securing member for retaining the securing member in the respective first and second positions.

3. An assembly according to claim 1, wherein said securing member includes a pair of elastic legs which are disposed at opposite lateral sides of the cable supporting member when in an assembled condition with said securing member in said second position.

4. An assembly according to claim 1, wherein said outer sleeve and securing member include respective catch detent surfaces which operate to hold the securing member on the outer sleeve in at least one of said first and second positions.

5. An assembly according to claim 4, wherein said securing member includes a pair of elastically deformable legs which in use straddle the cable supporting member, and wherein the catch detent surfaces on the securing member are on steps formed on the respective legs.

6. An assembly according to claim 5, wherein the catch detent surfaces include a pair of detent steps formed respectively on each of the securing member legs and on facing inner walls of the outer sleeve.

7. An assembly according to claim 4, wherein said catch detent surfaces are configured to hold the securing member in both of the respective first and second positions.

8. An assembly according to claim 6, wherein said catch detent surfaces are configured to hold the securing member in both of the respective first and second positions.

9. An assembly according to claim 8, wherein both pairs of detent steps of the second member are engaged with corresponding ones of the pairs of detent steps on the outer sleeve when said securing member is in said second position.

10. An assembly according to claim 8, wherein only one set of detent steps are engaged when the securing member is in said first position.

\* \* \* \* \*